`US008686107B2`

(12) United States Patent
Masubuchi et al.

(10) Patent No.: US 8,686,107 B2
(45) Date of Patent: Apr. 1, 2014

(54) POLYCARBONATE DIOL

(75) Inventors: Tetsuo Masubuchi, Tokyo (JP);
Eizaburo Ueno, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/742,544

(22) PCT Filed: Nov. 4, 2008

(86) PCT No.: PCT/JP2008/070026
§ 371 (c)(1),
(2), (4) Date: May 12, 2010

(87) PCT Pub. No.: WO2009/063767
PCT Pub. Date: May 22, 2009

(65) Prior Publication Data
US 2010/0261852 A1 Oct. 14, 2010

(30) Foreign Application Priority Data

Nov. 16, 2007 (JP) .................................. 2007-297408

(51) Int. Cl.
*C08G 64/00* (2006.01)

(52) U.S. Cl.
USPC ........... 528/372; 525/452; 525/453; 525/461; 525/462; 525/467; 525/469; 528/44; 528/85

(58) Field of Classification Search
USPC ................. 525/452, 453, 461, 462, 467, 469; 528/44, 85, 372
See application file for complete search history.

(56) References Cited

U.S. PATENT DOCUMENTS

| 4,891,421 A | 1/1990 | Nishimura et al. |
| 5,436,399 A | 7/1995 | Koyama et al. |
| 6,706,932 B1 | 3/2004 | Konishi et al. |
| 7,005,495 B2 | 2/2006 | Konishi et al. |
| 2003/0176622 A1* | 9/2003 | Konishi et al. ................. 528/196 |
| 2006/0293468 A1 | 12/2006 | Rische et al. |

FOREIGN PATENT DOCUMENTS

| EP | 1288241 | 3/2003 |
| EP | 1 849 814 A1 | 10/2007 |
| JP | 2570300 | 1/1989 |
| JP | 2885872 | 1/1992 |
| JP | 5-25264 | 2/1993 |
| JP | 05-025264 | * 2/1993 ............. C08G 64/02 |
| JP | 3128275 | 2/1993 |
| JP | 6-206965 | 7/1994 |
| JP | 2005048141 A | 2/2005 |
| JP | 3724561 | 9/2005 |
| JP | 2006-104253 | 4/2006 |
| JP | 2006-124486 | 5/2006 |
| JP | 3859241 | 12/2006 |
| JP | 2007-2248 | 1/2007 |
| JP | 3874664 | 1/2007 |
| TW | 564252 | 12/2003 |
| WO | 94/07934 | 4/1994 |
| WO | 01/34543 | 5/2001 |

OTHER PUBLICATIONS

International Search Report for PCT/JP2008/070026, mailed Jan. 13, 2009.
U.S. Appl. No. 12/742,478 to Masabuchi et al., entitled "Polycarbonate Diol with Ease of Reaction Stabilization," which application is the National Stage of PCT/JP2008/070027, filed Nov. 4, 2008.
English language Abstract for JP4007327, published Jan. 10, 1992 (corresponding to JP 2885872).
English language Abstract for JP5025264, published Feb. 2, 1993 (corresponding to JP 3128275).
English language Abstract for JP2001270938, published Oct. 2, 2001 (corresponding to JP 3724561).
Moore et al., "Novel co-polymer ploycarbonate diols for polyurethane elastomer applications", Conference Proceedings—Polyurethanes Expo, Oct. 3, 2003, pp. 241-248, XP009109526.
E.P.O. Office action that issued with respect to patent family member European Patent Application No. 08850010.3, mail date is Dec. 5, 2011.
Office action that issued with respect to patent family member Chinese Patent Application No. 200880116028.4, mail date is Jul. 15, 2011.
Korea Office action that issued with respect to patent family member Korean Patent Application No. 10-2010-7007719, mail date is Oct. 10, 2011.
Third Party Submission and Detailed Reason for Submission with respect to patent family member Japanese Patent Application No. 2009-541099, mail date is Jun. 6, 2012.

(Continued)

*Primary Examiner* — Robert Jones, Jr.
(74) *Attorney, Agent, or Firm* — Greenblum & Bernstein, P.L.C.

(57) ABSTRACT

A polycarbonate diol comprising repeating units represented by the following formula (A) and a terminal hydroxy group, 60-100 mol % of the repeating units represented by the formula (A) being repeating units represented by the following formula (B) or (C). The amount of the repeating units represented by the formula (B) is 60-100 mol % based on the total amount of the repeating units represented by the formula (A). The polycarbonate diol has a terminal primary OH ratio of 95% or higher. (A) (In the formula, R represents a $C_{2-12}$ divalent aliphatic or alicyclic hydrocarbon.)

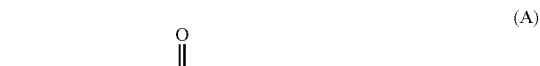

(A)

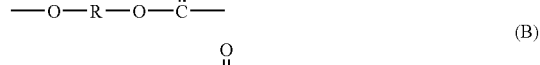

(B)

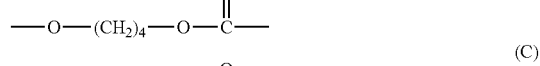

(C)

4 Claims, No Drawings

(56) References Cited

OTHER PUBLICATIONS

Third Party Observations regarding counterpart European Application No. EP 08850010.3, dated Jul. 23, 2012.
Machine Translation of JP 05-025264 A.
Supplemental European Search Report that issued with respect to patent family member European Patent Application No. 08850010.3, mail date is Nov. 7, 2011.
E.P.O. Office action issued with respect to counterpart European Application No. 08 850 010.3, mail date is Oct. 1, 2012.
Taiwanese Office action issued with respect to counterpart Taiwanese Application No. 097142904, mail date is Sep. 21, 2012.
Third Party Observations issued with respect to counterpart European Application No. 08850010.3, dated Mar. 19, 2013.

* cited by examiner

POLYCARBONATE DIOL

TECHNICAL FIELD

The present invention relates to a polycarbonate diol suitable as a raw material for polyurethanes, thermoplastic elastomers and the like, or as a constituent material for coating materials, adhesives and the like. Particularly, the present invention relates to a polycarbonate diol which can provide a polyurethane and a thermoplastic elastomer superior in strength, elongation and impact resilience, and superior in chemical resistances including oleic acid resistance and chlorine resistance, to the cases of using conventional polycarbonate diols.

BACKGROUND ART

It is known that polyurethane, a thermoplastic elastomer and the like excellent in hydrolysis resistance, light resistance, oxidative degradation resistance, heat resistance and the like are obtained when polycarbonate diols are used as a soft segment thereof. However, since a polycarbonate diol using 1,6-hexanediol as a raw material is crystalline, a polyurethane using the polycarbonate diol has a drawback of exhibiting low flexibility and elastic recovery. In order to solve these problems, an aliphatic copolycarbonate diol using two or more types of diols is disclosed. Particularly among them, an aliphatic copolycarbonate diol using 1,4-butanediol attracts attention as a polycarbonate diol which can provide a thermoplastic elastomer excellent in chemical resistances including oleic acid resistance and chlorine resistance (see PATENT DOCUMENTS 1 and 2).

On the other hand, in the case where a polycarbonate diol is used as a raw material for polyurethanes, thermoplastic elastomers, urethane elastic fibers and the like, or as a constituent material for coating materials, adhesives and the like, the polycarbonate diol is reacted with a compound having a functional group reactive with a hydroxyl group, such as an isocyanate. Herein, the reactivity of a compound having a functional group reactive with a hydroxyl group with a polycarbonate diol is very important from the viewpoint of the production and the product quality. Particularly in the case of a low polymerization rate, the molecular weight cannot be raised up to a target molecular weight in some cases. The polyurethane and the thermoplastic elastomer obtained have low strength, elongation and impact resilience also in some cases.

In order to control the reaction rate in the above-mentioned reaction, various types of polycarbonate diols and manufacturing methods thereof have been disclosed hitherto. As an aliphatic copolycarbonate diol using 1,4-butane diol, a polycarbonate diol exhibiting a stable urethane reactivity without using a reaction regulator is disclosed (see PATENT DOCUMENT 3). On the other hand, the polymer terminal hydroxyl group of a polycarbonate diol is important with respect to the reactivity between a compound having a functional group reactive with the hydroxyl group and the polycarbonate diol. With respect to the polymer terminal hydroxyl group of a polycarbonate diol, there are disclosed methods for manufacturing a polycarbonate diol whose terminals are almost completely consisting of hydroxyl groups by using a dialkyl carbonate or a diaryl carbonate, and a polyhydroxyl compound as raw materials (see PATENT DOCUMENTS 4 and 5). These methods aim at solving a problem that, in the case where a polycarbonate diol is manufactured using a dialkyl carbonate or a diaryl carbonate as a carbonate raw material, alkyl groups or aryl groups originated from the carbonate remain at polymer terminals, and thereby manufacturing a polycarbonate diol almost all of whose polymer terminals are hydroxyl groups. These PATENT DOCUMENTS do not describe the type of the hydroxyl group at the polymer terminal and the control thereof.

A polycarbonate diol having a high primary terminal OH ratio is further disclosed (see PATENT DOCUMENT 6). The polycarbonate diol, although providing a high polymerization rate, cannot be said to have a sufficient chemical resistance as long as the polycarbonate diol has the described composition of the repeating units. There is further disclosed a polycarbonate diol in which the ratio of the polymer terminal hydroxyl group has a specified value (see PATENT DOCUMENT 7). However, with the disclosed ratio of the polymer terminal hydroxyl group, a high-molecular weight polyurethane cannot be made by polymerization in some cases; and only the ratio of the polymer terminal hydroxyl group is specified and there is no description regarding primary hydroxyl groups in the hydroxyl groups.

As described above, technologies to date cannot present a polycarbonate diol which can provide a polyurethane and a thermoplastic elastomer excellent in strength, elongation and impact resilience, and excellent also in chemical resistances including oleic acid resistance and chlorine resistance.

PATENT DOCUMENT 1: Japanese Patent No. 2885872
PATENT DOCUMENT 2: JP 2007-2248 A
PATENT DOCUMENT 3: Japanese Patent No. 3128275
PATENT DOCUMENT 4: Japanese Patent No. 2570300
PATENT DOCUMENT 5: Japanese Patent No. 3724561
PATENT DOCUMENT 6: Japanese Patent No. 3874664
PATENT DOCUMENT 7: JP 2006-104253 A

DISCLOSURE OF THE INVENTION

Problems to be Solved by the Invention

The present invention relates to a polycarbonate diol suitable as a raw material for polyurethanes, thermoplastic elastomers and the like, or as a constituent material for coating materials, adhesives and the like. Particularly, the present invention has an object to provide a polycarbonate diol which can provide a polyurethane and a thermoplastic elastomer superior in strength, elongation and impact resilience, and superior in chemical resistances including oleic acid resistance and chlorine resistance, to the cases of using conventional polycarbonate diols.

Means for Solving the Problems

As a result of intensive studies to solve the above-mentioned problems, the present inventors have found that, in a polycarbonate diol containing repeating units represented by the following formula (A) and a terminal hydroxyl group, making the amount of repeating units represented by the following formula (B) based on the total amount of the repeating units represented by the formula (A) and the ratio of the primary terminal OH in specific ranges can provide a polyurethane and a thermoplastic elastomer superior in strength, elongation and impact resilience and superior in chemical resistances including oleic acid resistance and chlorine resistance to the cases of using conventional polycarbonate diols. These findings have achieved the present invention.

That is, the present invention relates to the following five aspects (1) to (5).
(1) A polycarbonate diol comprising repeating units represented by the following formula (A) and a terminal hydroxyl group, characterized in that from 60 to 100 mol % of the repeating units represented by the formula (A) are repeating units represented by the following formula (B) or (C); the amount of the repeating units represented by the formula (B) is from 60 to 100 mol % based on the total amount of the repeating units represented by the formula (A); and the polycarbonate diol has a primary terminal OH ratio of 95% or higher.

[Formula 1]

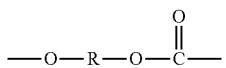
(A)

(In the formula, R represents a divalent aliphatic or alicyclic hydrocarbon having 2 to 12 carbon atoms.)

[Formula 2]

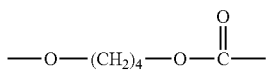
(B)

[Formula 3]

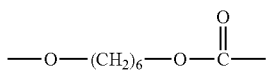
(C)

(2) The polycarbonate diol according to (1), wherein from 65 to 100 mol % of the repeating units represented by the formula (A) are repeating units represented by the formula (B) or (C); the amount of the repeating units represented by the formula (B) is from 60 to 95 mol % based on the total amount of the repeating units represented by the formula (A).
(3) The polycarbonate diol according to (1) or (2), wherein a sum of the primary terminal OH ratio and the secondary terminal OH ratio is 98.5% or higher.
(4) The polycarbonate diol according to any one of (1) to (3), wherein from 90 to 100 mol % of the repeating units represented by the formula (A) shown above are repeating units represented by the formula (B) or (C) shown above; the amount of the repeating units represented by the formula (B) is from 70 to 95 mol % based on the total amount of the repeating units represented by the formula (A); and the polycarbonate diol has a number-average molecular weight of from 300 to 20,000.
(5) A thermoplastic polyurethane, obtained by copolymerizing the polycarbonate diol according to any one of (1) to (4) and a polyisocyanate.

Effect of the Invention

The present invention provides a polycarbonate diol optimum as a raw material for polyurethanes, thermoplastic elastomers and the like, and as a constituent material for coating materials, adhesives and the like. Particularly, the present invention has an advantage of providing a polycarbonate diol capable of providing a polyurethane and a thermoplastic elastomer excellent in strength, elongation and impact resilience and excellent in chemical resistances including oleic acid resistance and chlorine resistance.

BEST MODE FOR CARRYING OUT THE INVENTION

Hereinafter, the present invention will be described specifically.

When a polycarbonate diol is used as a raw material for polyurethanes, thermoplastic elastomers, urethane elastic fibers and the like, or as a constituent material for coating materials, adhesives and the like, the polycarbonate diol is reacted with a compound having a functional group reactive with a hydroxyl group, such as an isocyanate. The reactivity of the compound with a polycarbonate diol is very important. Especially in the case where the polymerization rate is slow, the polymerization up to the target molecular weight cannot be achieved. Further there arises a problem that the strength, elongation and impact resilience of the obtained polyurethane and thermoplastic elastomer are low. The present invention has found an optimum value of the primary terminal OH ratio in a polycarbonate diol, and has allowed for providing a polyurethane and a thermoplastic elastomer almost free from above-mentioned problems.

The primary terminal OH ratio in the present invention means a value calculated by the following formula (1) from values of peak areas of a chromatogram obtained by subjecting a recovered solution to the gas chromatography (GC) analysis, wherein the recovered solution is obtained by heating a polycarbonate diol (70 g to 100 g) at a pressure of 0.4 kPa or lower and at a temperature of from 160° C. to 200° C. under stirring to obtain a fraction of an amount corresponding to about 1 to 2% by weight of the polycarbonate diol, that is, a fraction of about 1 g (0.7 to 2 g), and recovering the fraction using about 100 g (95 to 105 g) of ethanol as a solvent.

$$\text{Primary terminal OH ratio (\%)} = B/A \times 100 \tag{1}$$

A: the sum of the peak areas of alcohols (excluding ethanol) including diols
B: the sum of the peak areas of the diols having primary OH groups at both terminals thereof.

The primary terminal OH ratio is a proportion of primary OH groups to all the terminal groups of the polycarbonate diol. That is, as described above, heating a polycarbonate diol at a pressure of 0.4 kPa or lower and at a temperature of 160° C. to 200° C. makes terminal parts of the polycarbonate diol leave as alcohols, which evaporate and are obtained as a fraction (see the following formula (a)).

[Formula 4]

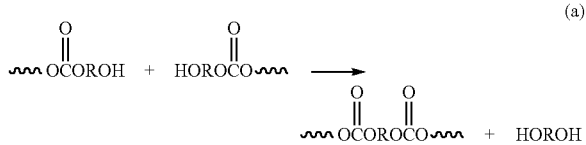
(a)

(In the Formula, R Represents a Hydrocarbon.)

The proportion of diols both terminals of which are primary OH groups to all the alcohols in the fraction is the primary terminal OH ratio.

If the primary terminal OH ratio is 95% or higher, a polyurethane and a thermoplastic elastomer excellent in strength, elongation and impact resilience can be provided. If the primary terminal OH ratio is lower than 95%, there often arise such problems that the polymerization up to the target molecular weight cannot be achieved or takes a long time, so the productivity decreases; and additionally, the tensile strength and impact resilience of the obtained polyurethane and thermoplastic elastomer decrease. If the primary terminal OH ratio is 97% or higher, the above-mentioned problems hardly occur and additionally, the reaction is stabilized not depending on the reactivity of the isocyanate used, which is preferable. If the primary terminal OH ratio is 98% or higher, the above-mentioned problems scarcely occur, which is more preferable.

The composition of repeating units in a polycarbonate diol has a large influence on the flexibility and chemical resistance of a polyurethane and a thermoplastic elastomer obtained using the polycarbonate diol. The polycarbonate diol according to the present invention has a proportion (hereinafter, referred to as C46 proportion) of the repeating units represented by the formula (B) or (C) shown below of from 60 to 100 mol % based on the repeating units represented by the formula (A) shown below. In the case of a C46 proportion of less than 60 mol %, the chemical resistance is insufficient or the flexibility is impaired in some cases, which is not preferable. In the case of a C46 proportion of from 65 to 100 mol %, a polyurethane and a thermoplastic elastomer excellent in the balance between the chemical resistance and the flexibility can be obtained, which is preferable. In the case of a C46 proportion of from 90 to 100 mol %, the balance between the chemical resistance and the flexibility is optimal, which is more preferable.

The polycarbonate diol according to the present invention has a proportion (hereinafter, referred to as C4 proportion) of the repeating units represented by the following formula (B) of 60 to 100 mol % based on the total of a repeating units represented by the formula (A) shown below. In the case of a C4 proportion of less than 60 mol %, depending on the type of chemicals, a sufficient chemical resistance cannot be obtained in some cases, which is not preferable. In the case of a C4 proportion near 100 mol %, the chemical resistance of the obtained polyurethane and thermoplastic elastomer is enhanced, but since the crystallinity of the polycarbonate diol is remarkably high, depending on the composition of the polyurethane or the thermoplastic elastomer, the flexibility decreases in some cases. In the case of a C4 proportion of from 60 to 95 mol %, a high chemical resistance can be obtained without impairing the flexibility, which is preferable. In the case of a C4 proportion of 70 to 95 mol %, a high flexibility and chemical resistance can be obtained, which is most preferable.

[Formula 5]

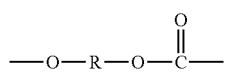

(A)

(In the formula, R represents a divalent aliphatic or alicyclic hydrocarbon having 2 to 12 carbon atoms.)

[Formula 6]

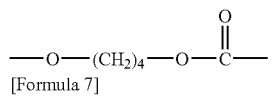

(B)

[Formula 7]

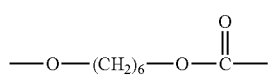

(C)

A method for manufacturing the polycarbonate diol according to the present invention is not especially limited. The polycarbonate diol can be manufactured by one of various methods, for example, cited in Schnell, Polymer Reviews, vol. 9, pp. 9-20 (1994).

The polycarbonate diol according to the present invention is manufactured using 1,4-butanediol and 1,6-hexanediol as diols. One or two or more diol(s) selected from dials having no side chain such as ethylene glycol, 1,3-propanediol, 1,5-pentanediol, 1,7-heptanediol, 1,8-octanediol, 1,9-nonanediol, 1,10-dodecanediol, 1,11-undecanediol and 1,12-dodecanediol; diols having a side chain such as 2-methyl-1,8-octanediol, 2-ethyl-1,6-hexanediol, 2-methyl-1,3-propanediol, 3-methyl-1,5-pentanediol, 2,4-dimethyl-1,5-pentanediol, 2,4-diethyl-1,5-pentanediol, 2-butyl-2-ethyl-1,3-propanediol and 2,2-dimethyl-1,3-propanediol; and cyclic diols such as 1,4-cyclohexane dimethanol and 2-bis(4-hydroxycyclohexyl)-propane may be further added as raw materials. The addition amount is not especially limited as long as the conditions of the present invention are satisfied. A compound having 3 or more hydroxyl groups in one molecule thereof, for example, trimethylolethane, trimethylolpropane, hexanetriol and pentaerythritols may be also used in a small amount. Use of an excessive amount of the compound having 3 or more hydroxyl groups in one molecule thereof results in crosslinking causing gelation during the polymerization reaction of a polycarbonate. Therefore, the compound having 3 or more hydroxyl groups in one molecule thereof is preferably used in an amount of from 0.01 to 5% by weight, and more preferably from 0.01 to 1% by weight, based on the total amount of 1,4-butanediol and 1,6-hexanediol.

Carbonates for the polycarbonate diol according to the present invention include dialkyl carbonates such as dimethyl carbonate, diethyl carbonate, dipropyl carbonate and dibutyl carbonate; diaryl carbonates such as diphenyl carbonate; and alkylene carbonates such as ethylene carbonate, trimethylene carbonate, 1,2-propylene carbonate, 1,2-butylene carbonate, 1,3-butylene carbonate and 1,2-pentylene carbonate. One carbonate or two or more carbonates among these can be used as raw material(s). From the viewpoint of ease of availability and ease of setting conditions for the polymerization reaction, use of dimethyl carbonate, diethyl carbonate, diphenyl carbonate, dibutyl carbonate or ethylene carbonate is preferable.

In manufacture of the polycarbonate diol according to the present invention, a catalyst may be added or not. In the case of adding a catalyst, the catalyst can be selected from common transesterification catalysts without specific limitations. Catalysts used are, for example, metals such as lithium, sodium, potassium, rubidium, cesium, magnesium, calcium, strontium, barium, zinc, aluminum, titanium, cobalt, germanium, tin, lead, antimony, arsenic and cerium, and salts, alkoxides and organic compounds thereof. Especially preferable are compounds of titanium, tin or lead. The use amount of the catalyst is commonly from 0.00001 to 0.1% of the weight of the polycarbonate diol.

As an example of the manufacturing method, a method using dimethyl carbonate as a carbonate will be described. Manufacture of the polycarbonate diol is carried out in two stages. A diol and dimethyl carbonate are mixed in a proportion of 20:1 to 1:10 in molar ratio, and reacted at ordinary pressure or reduced pressure at from 100 to 300° C.; and methanol produced is removed as a mixture with dimethyl carbonate to obtain a low-molecular weight polycarbonate diol. Then, the low-molecular weight polycarbonate diol is made to self-condensate while the unreacted diol and dimethyl carbonate are removed, by heating at from 160 to 250° C. at reduced pressure, to obtain a polycarbonate diol of predetermined-molecular weight.

The polycarbonate diol having the primary terminal OH ratio according to the present invention can be obtained by selecting a condition or suitably combining conditions from the polymerization conditions including the purity of a raw material diol, the temperature and the time, and further in the case of using a dialkyl carbonate and/or a diaryl carbonate as a carbonate, from conditions such as the charge ratio between the diol and the carbonate. Industrially obtained 1,6-hexanediol contains from 0.1 to 2% by weight of impurities having a secondary hydroxyl group such as 1,4-cyclohexanediol. Since diols having a secondary hydroxyl group have a low transesterification reactivity in the manufacture of a polycarbonate diol, the diols tend to become a terminal group of the polycarbonate diol, resulting in a polycarbonate diol having a secondary hydroxyl group at a terminal. In the case of using a dialkyl carbonate and/or a diaryl carbonate as a carbonate, if the reaction is carried out by placing a diol and a carbonate in a stoichiometric or near-stoichiometric proportion in accordance with the molecular weight of the target polycarbonate diol, alkyl groups or aryl groups originated from the carbonate tend to remain at terminals of the polycarbonate diol. Then, setting the amount of the diols based on the carbonates at 1.01 to 1.30 times the stoichiometric amount can decrease alkyl group or aryl group terminals remaining at terminals of the polycarbonate diol. Further, side reactions sometimes make terminals of the polycarbonate diol vinyl groups, and in the case of using, for example, dimethyl carbonate as a carbonate, methyl esters or methyl ethers. Generally, side reactions more easily occur at a higher reaction temperature and for a longer reaction time.

The primary terminal OH ratio is preferably so controlled that the terminal of a polycarbonate diol other than those of the predetermined primary terminal OH ratio becomes a secondary hydroxyl group. In the case where a terminal of a polycarbonate diol is an alkyl group, an aryl group, or a vinyl group originated from a carbonate, since these function as a chain terminator in the polymerization reaction of a polyurethane or a thermoplastic elastomer, depending on a target molecular weight thereof, polymerization up to the target molecular weight is difficult in some cases. Further, the molecular weight distribution of the obtained polyurethane or thermoplastic elastomer is broad and the strength and the impact resilience are impaired in some cases.

The secondary terminal OH ratio in the present invention means a value calculated by the following formula (2) from peak area values of a chromatograph obtained by the same analysis as that of the primary terminal OH ratio.

Secondary terminal OH ratio (%)=$C/A \times 100$ (2)

A: the sum of the peak areas of alcohols (excluding ethanol) including diols

C: the sum of the peak areas of the diols having at least one secondary hydroxyl group In the case where a polymer terminals is a secondary hydroxyl group, a diol in which a hydroxyl group of at least one terminal is secondary leaves the polymer terminal (see the following formula (b)).

[Formula 8]

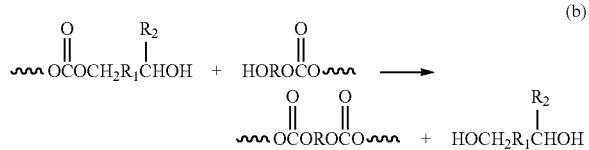

(b)

(In the formula, R, $R_1$ and $R_2$ each represent a hydrocarbon.)

The proportion of diols at least one hydroxyl group of which is secondary to all alcohols in the fraction is the secondary terminal OH ratio.

In the polycarbonate diol according to the present invention, the sum of the primary terminal OH ratio and the secondary terminal OH ratio is preferably 98.5% or higher. If the sum of the primary terminal OH ratio and the secondary terminal OH ratio is 98.5% or higher, the molecular weight of the polyurethane or the thermoplastic elastomer reaches the target value, which is preferable. Further, the molecular weight distribution does not broaden and the strength and the impact resilience of the polyurethane or the thermoplastic elastomer do not decrease, which is preferable. If the sum of the primary terminal OH ratio and the secondary terminal OH ratio is 99.0% or higher, a polyurethane and a thermoplastic elastomer having the target molecular weight can be obtained without being influenced by the isocyanate and the reaction condition used, which is more preferable; and if that is 99.5% or higher, a polyurethane and a thermoplastic elastomer excellent in strength and impact resilience can be obtained, which is most preferable.

In order to control the primary terminal OH ratio and/or the secondary terminal OH ratio, a diol having a secondary hydroxyl group may be added according to need. The diol having a secondary hydroxyl group may be added in a raw material, in the course of polycarbonate diol manufacture, or after a predetermined molecular weight is achieved. In a method in which a diol having a secondary hydroxyl group is added to an obtained polycarbonate diol and the mixture is heated, the heat treatment temperature is from 120° C. to 190° C., and preferably from 130° C. to 180° C. If the heating temperature is lower than 120° C., the reaction is slow and the treatment time is long, which is economically problematic; and if that exceeds 190° C., there is a high possibility of causing problems such as coloration. Although the heat treatment time varies depending on the reaction temperature and the treatment method, it commonly is from 15 min to 10 hours. Diols having a secondary hydroxyl group include diols having a primary hydroxyl group and a secondary hydroxyl group such as 1,2-propanediol, 1,3-butanediol, 1,2-pentanediol, 1,4-pentanediol, 1,2-hexanediol, 1,5-hexanediol, 2-ethyl-1,3-hexanediol, 1,2-octanediol and 1,2-decanediol; diols having two secondary hydroxyl groups such as 1,2-cyclopentanediol, 1,3-cyclopentanediol, 1,3-cyclohexanediol, 1,4-cyclohexanediol, 2,3-butanediol, 2,4-pentanediol, 2,5-hexanediol and 3,5-heptanediol; and diols having one secondary hydroxyl group and one tertiary hydroxyl group such as 2-methyl-2,4-pentanediol. These diols are used singly or as a mixture of two or more.

In the polycarbonate diol according to the present invention, the number-average molecular weight is preferably from 300 to 20,000. With the number-average molecular weight of 300 or higher, the flexibility and the characteristics at low temperatures of the obtained thermoplastic polyurethane are sufficient; and with that of 20,000 or lower, the moldability of the obtained thermoplastic polyurethane does not decrease, which are preferable. The number-average molecular weight is more preferably in the range of from 450 to 5,000, and still more preferably from 500 to 3,000.

The number-average molecular weight in the present invention was calculated using the following formula (3) of which a hydroxyl value was determined by "the neutralization titration method (JIS K 0070-1992)", in which acetic anhydride and pyridine are used and the titration is performed with an ethanol solution of potassium hydroxide.

Number-average molecular weight=$2/(\text{OH value} \times 10^{-3}/56.1)$ (3)

The polycarbonate diol according to the present invention is a polycarbonate diol using 1,4-butanediol and 1,6-hexanediol as diols; and setting the composition of repeating units thereof and the primary terminal OH ratio in specified ranges can provide a polyurethane and a thermoplastic elastomer simultaneously having characteristics excellent in chemical resistances including oleic acid resistance and chlorine resistance and the strength, flexibility and elastic recovery capability, in addition to the hydrolysis resistance and heat resistance which polyurethanes and thermoplastic elastomers obtained using polycarbonate diols conventionally have. It can be said to be a polycarbonate diol suitable as a raw material for polyurethanes, thermoplastic elastomers and the like, and as a constituent material for coating materials, adhesives and the like.

By reacting the polycarbonate diol according to the present invention with a polyisocyanate, a thermoplastic polyurethane can be obtained.

Polyisocyanates used for the manufacture of the thermoplastic polyurethane according to the present invention include, for example, publicly known aromatic diisocyanates such as 2,4-tolylene diisocyanate, 2,6-tolylene diisocyanate and mixtures thereof (TDI), diphenylmethane-4,4'-diisocyanate (MDI), naphthalene-1,5-diisocyanate (NDI), 3,3'-dimethyl-4,4'-biphenylene diisocyanate, crude TDI, polymethylene polyphenyl isocyanate, and crude MDI; publicly known aromatic alicyclic diisocyanates such as xylylene diisocyanate (XDI) and phenylene diisocyanate; publicly known aliphatic diisocyanates such as 4,4'-methylenebiscyclohexyl diisocyanate (hydrogenated MDI), hexamethylene diisocyanate (HMDI), isophorone diisocyanate (IPDI) and cyclohexane diisocyanate (hydrogenated XDI); and isocyanurate modified products, a carbodiimide modified products and biuret modified products of these isocyanates.

In the manufacture of the thermoplastic polyurethane according to the present invention, a chain extender can be used as a copolymerization component. As a chain extender, chain extenders in common use in polyurethane industries can be used. Examples of chain extenders include water, low-molecular polyols and polyamines as publicly known chain extenders as cited in Keiji Iwata (supervisor), "Newest Polyurethane Application Technology", (published by CMC Publishing Co., Ltd., Japan, in 1985), pp. 25-27 (in Japanese). Further, publicly known polymeric polyols may be concurrently used as a chain extender in the range not impairing the effect of the present invention according to applications of the thermoplastic polyurethane. Examples of publicly known polymeric polyols include publicly known polyester polyols, and polyether carbonates having a polyoxyalkylene chain (that is, polyether carbonate polyols) as cited in Yoshio Imai "Polyurethane Foam", (Kobunshi Kankokai, Japan, 1987), pp. 12-23 (in Japanese). Specifically, as the above-mentioned low-molecular polyols as a chain extender, diols having a molecular weight of 300 or lower are commonly used. Low-molecular polyols include, for example, aliphatic diols such as ethylene glycol, 1,3-propanediol, 1,4-butanediol, 1,5-pentanediol, 1,6-hexanediol, neopentyl glycol and 1,10-decanediol. Further examples of low-molecular polyols as a chain extender include alicyclic diols such as 1,1-cyclohexane dimethanol, 1,4-cyclohexane dimethanol; and tricyclodecane dimethanol, xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone and 1,1-bis[4-(2-hydroxyethoxy)phenyl]cyclohexane. Preferably, ethylene glycol and 1,4-butanediol are used.

As a method for manufacturing the thermoplastic polyurethane according to the present invention, a technology of the polyurethane reaction publicly known in polyurethane industries is used. The thermoplastic polyurethane can be manufactured, for example, by reacting the polycarbonate diol according to the present invention with an organic polyisocyanate at atmospheric pressure at a temperature from ordinary temperature to 200° C. In the case of using a chain extender, the chain extender may be added at the start of the reaction, or in the course of the reaction. A manufacturing method of the thermoplastic polyurethane can be referred to, for example, U.S. Pat. No. 5,070,173.

In the polyurethane reaction, publicly known polymerization catalysts typified by tertiary amines and organic metal salts of tin, titanium and the like (for example, those cited in Keiji Yoshida, "Polyurethane Resin" (published by The Nikkan Kogyo Shimbun, Ltd., in 1969), pp. 23-32 (in Japanese)) can be used.

The polyurethanization reaction may be carried out using a solvent. Preferable examples of the solvent include dimethylformamide, diethylformamide, dimethylacetamide, dimethyl sulfoxide, tetrahydrofuran, methyl isobutyl ketone, dioxane, cyclohexanone, benzene, toluene and ethyl cellosolve.

In the manufacture of the thermoplastic polyurethane according to the present invention, a compound having only one active hydrogen atom reactive with an isocyanate group, for example, monohydric alcohols such as ethyl alcohol and propyl alcohol, and secondary amines such as diethylamine and di-n-propylamine, can be used as a terminator.

To the thermoplastic polyurethane according to the present invention, a stabilizer such as a thermal stabilizer (for example, an antioxidant) or a light stabilizer is desirably added. Antioxidants (thermal stabilizers) usable are phosphorus compounds such as aliphatic, aromatic or alkyl-substituted aromatic esters of phosphoric acid or phosphorous acid, and phosphinic acid derivatives, phenylphosphonic acid, phenylphosphinic acid, diphenylphosphonic acid, polyphosphonates, dialkylpentaerythritol diphosphite and dialkylbisphenol A diphosphite; phenolic derivatives, especially hindered phenolic compounds; compounds containing sulfur such as thioethers, dithioates, mercaptobenzimidazoles, thiocarbanilides and thiodipropionate; and tin compounds such as tin malate and dibutyltin monoxide. The antioxidants can generally be classified into primary, secondary and tertiary antiaging agents. As the hindered phenol compound as a primary antiaging agent, Irganox1010 and Irganox1520 (trade names; made by Ciba-Geigy Corp., Switzerland) or the like is particularly preferable. As the phosphorus compound as a secondary antiaging agent, PEP-36, PEP-24G and HP-10 (any of which is a trade name; made by Adeka Corp., Japan) and Irgafos168 (trade name; made by Ciba-Geigy Corp., Switzerland) is preferable. As the sulfur compound as a tertiary antiaging agent, thioether compound such as dilauryl thiopropionate (DLTP) or distearyl thiopropionate (DSTP) is preferable.

The light stabilizers include ultraviolet absorption type light stabilizers and radical scavenging type light stabilizers.

Examples of the ultraviolet absorption type light stabilizers include, for example, benzotriazole and benzophenone compounds. The radical scavenging type light stabilizers include, for example, hindered amine compounds. These stabilizers may be used singly or in combination of two or more.

The addition amount of the stabilizer is preferably from 0.01 to 5 parts by weight, more preferably from 0.1 to 3 parts by weight, and still more preferably from 0.2 to 2 parts by weight, based on 100 parts by weight of the thermoplastic polyurethane.

A plasticizer may be added to the thermoplastic polyurethane according to the present invention. Examples of the plasticizers include phthalates such as dioctyl phthalate, dibutyl phthalate, diethyl phthalate, butyl benzyl phthalate, di-2-ethylhexyl phthalate, diisodecyl phthalate, diundecyl phthalate and diisononyl phthalate; phosphates such as tricresyl phosphate, triethyl phosphate, tributyl phosphate, tri-2-ethylhexylphosphate, trimethylhexyl phosphate, tris-chloroethyl phosphate and tris-dichloropropyl phosphate; trimellitates such as octyl trimellitate and isodecyl trimellitate; fatty acid esters such as dipentaerythritol esters, dioctyl adipate, dimethyl adipate, di-2-ethylhexyl azelate, dioctyl azelate, dioctyl sebacate, di-2-ethylhexyl sebacate and methylacetyl ricinolate; pyromellitates such as octyl pyromellitate; epoxy plasticizers such as epoxidized soybean oil, epoxidized linseed oil and epoxidized fatty acid alkyl esters; polyetheric plasticizers such as adipic acid ether esters and polyethers; liquid rubbers such as liquid NBR, liquid acrylic rubbers and liquid polybutadiene; and non-aromatic paraffin oils. These plasticizers may be used singly or in combination of two or more. The addition amount of a plasticizer is suitably selected according to required hardness and physical properties, but is preferably from 0.1 to 50 parts by weight based on 100 parts by weight of the thermoplastic polyurethane.

An inorganic filler, a lubricant, a colorant, a silicone oil, a foaming agent, a flame retardant and the like may be added further to the thermoplastic polyurethane according to the present invention. The inorganic fillers include, for example, calcium carbonate, talc, magnesium hydroxide, mica, barium sulfate, silicic acid (white carbon), titanium oxide and carbon black. These various types of additives can be used in amounts generally used for conventional thermoplastic polyurethanes.

The Shore hardness D of the thermoplastic polyurethane according to the present invention is preferably in the range of from 20 to 70, and more preferably from 25 to 50. The shore hardness D of 20 or higher gives sufficiently high heat resistance and scratch resistance; and the Shore hardness D of 70 or lower does not give insufficient low-temperature performances and insufficient soft feeling.

With respect to the molecular weight of the thermoplastic polyurethane according to the present invention, the number-average molecular weight (Mn) in terms of polystyrene as measured by GPC analysis and the weight-average molecular weight (Mw) in terms of polystyrene as measured by GPC analysis are each preferably in the range of from 10,000 to 200,000.

EXAMPLES

Then, the present invention will be described in more detail by way of Examples and Comparative Examples.

1. Determination of the Primary Terminal OH Ratio

A polycarbonate diol of from 70 g to 100 g was weighed and placed in a 300-mL round-bottom flask, and heated and stirred at a pressure of 0.4 kPa or lower in a heating bath of about 180° C. using a rotary evaporator connected with a trap bulb for fraction recovery, to obtain a fraction corresponding to about 1 to 2% by weight of the polycarbonate diol, that is, about 1 g (0.7 to 2 g) of the fraction in the trap bulb. The fraction was recovered with about 100 g (95 to 105 g) of ethanol as a solvent; and the recovered solution was subjected to a gas chromatography analysis (hereinafter, referred to as GC analysis); and the primary terminal OH ratio was calculated by the following formula (1) from the values of the peak areas of the obtained chromatograph. The GC analysis was conducted using a gas chromatograph 6890 (made by Hewlett-Packard Development Corp., USA) equipped with DB-WAX (made by J & W Scientific Inc., USA) having a length of 30 m and a film thickness of 0.25 μm as a column and using a hydrogen flame ionization detector (FID) as a detector. The heating profile of the column was such that the temperature was raised at 10° C./min from 60° C. to 250° C., and held at the temperature for 15 min. The identification of each peak in the GC analysis was conducted using the following GC-MS apparatus. The GC apparatus 6890 (made by Hewlett-Packard Development Corp., USA) equipped with DB-WAX (made by J & W Scientific Inc., USA) as a column was used; and the temperature was raised at a heating rate of 10° C./min from an initial temperature of 40° C. up to 220° C. The MS apparatus used was an Auto-massSUN (made by JEOL Ltd., Japan); and the MS analysis was conducted at an ionization voltage of 70 eV in a scan range of from m/z=10 to 500 and at a photomultiplier gain of 450 V.

$$\text{Primary terminal OH ratio (\%)} = B/A \times 100 \tag{1}$$

A: the sum of the peak areas of alcohols (excluding ethanol) including diols

B: the sum of the peak areas of the diols having primary OH groups at both terminals thereof 2. Determination of the Secondary Terminal OH Ratio The GC analysis was conducted by the same method as in the primary terminal OH ratio; and the secondary terminal OH ratio was calculated by the following formula (2) from the values of the peak areas of the obtained chromatograph.

$$\text{Secondary terminal OH ratio (\%)} = C/A \times 100 \tag{2}$$

A: the sum of the peak areas of alcohols (excluding ethanol) including diols

C: the sum of the peak areas of the diols having at least one secondary hydroxyl group 3. Determination of the C4 Proportion and the C46 Proportion A sample in an amount of 1 g was weighed and placed in a 100-mL round-bottom flask; 30 g of ethanol and 4 g of potassium hydroxide were placed therein; and the mixture was heated in an oil bath at 100° C. for 1 hour. The solution was cooled to room temperature, and thereafter, one or two drops of phenolphthalein as an indicator was added thereto and the solution was neutralized with hydrochloric acid. The solution was cooled in a refrigerator for 3 hours and then the precipitated salt was removed by filtration and the filtrate was subjected to the GC analysis. The C4 proportion and the C46 proportion were calculated by the following formula (4) and the following formula (5), respectively. The GC analysis was conducted using a gas chromatograph GC14B (made by Shimadzu Corp.) equipped with DB-WAX (made by J & W Scientific Inc., USA) having a length of 30 m and a film thickness of 0.25 μm as a column, diethylene glycol diethyl ester as an internal standard, and a hydrogen flame ionization detector (FID) as a detector. The heating profile of the column was such that the temperature was held at 60° C. for 5 min, and thereafter raised at 10° C./min to 250° C.

$$C4 \text{ proportion (mol \%)} = D/F \times 100 \tag{4}$$

$$C46 \text{ proportion (mol \%)} = (D+E)/F \times 100 \tag{5}$$

D: the number of moles of 1,4-butanediol obtained in the GC analysis

E: the number of moles of 1,6-hexanediol obtained in the GC analysis

F: the total of the numbers of moles of diols obtained in the GC analysis

4. Purity Analysis of Diol Raw Materials

The 1,4-butanediol and the 1,6-hexanediol used as diol raw materials were subjected to the gas chromatography analysis conducted under such conditions that a gas chromatograph GC-14B (made by Shimadzu Corp.) equipped with DB-WAX (made by J & W Scientific Inc.) as a column, diethylene glycol diethyl ester as an internal standard, and FID as a detector were used. The heating profile of the column was such that the temperature was held at 60° C. for 5 min, and thereafter raised at 10° C./min to 250° C.

The purity of 1,4-butanediol was 99.6% by weight, and the remaining 0.4% by weight gave a plurality of unknown peaks. The 1,6-hexanediol had a purity of 99.0% by weight and contained 0.7% by weight of 1,4-cyclohexanediol. The remaining 0.3% by weight was a plurality of unknown substances.

5. Evaluations of the Molecular Weight and Physical Properties of the Thermoplastic Polyurethane (1) The Number-Average Molecular Weight and the Weight-Average Molecular Weight These were evaluated by GPC using a calibration curve obtained for standard polystyrenes.

(2) Shore D Hardness (No Unit)

The Shore D harness was measured according to ASTM D2240 D type at 23° C.

(3) Tensile Strength (kgf/cm$^2$)

The tensile strength was measured according to JIS K6251 using of No. 3 dumbbell. A press sheet of 2 mm in thickness was used as a test piece.

(4) Elongation (%)

The elongation was measured according to JIS K6251 using No. 3 dumbbell. A press sheet of 2 mm in thickness was used as a test piece.

(5) Impact Resilience (%)

The impact resilience was measured according to JIS K6255 using Lupke pendulum.

(6) Chemical Resistance

A polyurethane film of 0.07 to 0.10 mm in thickness was formed and the film was immersed in oleic acid (reagent grade 1) at 45° C. for one week and measured for a degree of swelling as an index of chemical resistance. The swelling ratio was calculated by the following formula (6).

Swelling ratio (%)=(weight after test−weight before test)/weight before test×100  (6)

Example 1

In a 1-L glass flask equipped with a rectifying tube filled with structured packings and a stirrer, 280 g (3.1 mol) of dimethyl carbonate, 200 g (2.2 mol) of 1,4-butanediol and 120 g (1.0 mol) of 1,6-hexanediol were placed. As a catalyst, 0.10 g of titanium tetrabutoxide was added thereto, and the mixture was stirred and heated at ordinary pressure. The reaction was performed for 10 hours while the reaction temperature was gradually raised from 150° C. to 180° C. and while a mixture of produced methanol and dimethyl carbonate was being distilled out. Thereafter, the pressure was reduced to 17 kPa and the reaction was performed at 180° C. further for 7 hours while the mixture of methanol and dimethyl carbonate was being distilled out. The analysis results of the obtained polycarbonate diol are summarized in Table 1.

Comparative Example 1

The reaction was performed by the method indicated in Example 1, except that the charge amounts of raw materials were 220 g (1.9 mol) of dimethyl carbonate, 160 g (1.8 mol) of 1,4-butanediol and 320 g (3.6 mol) of 1,6-hexanediol. The analysis results of the obtained polycarbonate diol are summarized in Table 1.

Comparative Example 2

The reaction was performed by the method indicated in Example 1, except that the charge amount of dimethyl carbonate was 330 g (3.7 mol) and 4.0 g (0.03 mol) of 1,4-cyclohexanediol was added to the raw materials. The analysis results of the obtained polycarbonate diol are summarized in Table 1.

Example 2

The polymerization was performed using the apparatus indicated in Example 1. In the apparatus, 420 g (3.6 mol) of diethyl carbonate, 200 g (2.2 mol) of 1,4-butanediol and 120 g (1.0 mol) of 1,6-hexanediol were placed. As a catalyst, 0.09 g of titanium tetrabutoxide was added thereto, and the mixture was stirred and heated at ordinary pressure. The reaction was performed for 10 hours while the reaction temperature was gradually raised from 150° C. to 180° C. and while a mixture of produced ethanol and diethyl carbonate was being distilled out. Thereafter, the pressure was reduced to 18 kPa and the reaction was performed at 180° C. further for 7 hours while the mixture of ethanol and diethyl carbonate was being distilled out. The analysis results of the obtained polycarbonate diol are summarized in Table 1.

Example 3

The polymerization was performed using the apparatus indicated in Example 1. In the apparatus, 320 g (3.6 mol) of ethylene carbonate, 250 g (2.8 mol) of 1,4-butanediol and 100 g (0.9 mol) of 1,6-hexanediol were placed. As a catalyst, 0.12 g of titanium tetrabutoxide was added thereto, and the mixture was stirred and heated at ordinary pressure. The reaction was performed for 10 hours while the reaction temperature was gradually raised from 150° C. to 180° C. and while a mixture of produced ethylene glycol and ethylene carbonate was being distilled out. Thereafter, the pressure was reduced to 15 kPa and the reaction was performed at 180° C. further for 7 hours while the mixture of diol and ethylene carbonate was being distilled out. The analysis results of the obtained polycarbonate diol are summarized in Table 1.

Example 4

The reaction was performed under the conditions indicated in Example 3, except for adding 5 g (0.04 mol) of 1,4-cyclohexanediol to the raw material. The analysis results of the obtained polycarbonate diol are summarized in Table 1.

Example 5

The reaction was performed under the conditions indicated in Example 3, except for adding 12 g (0.1 mol) of 1,4-cyclohexanediol to the raw material. The analysis results of the obtained polycarbonate diol are summarized in Table 1.

TABLE 1

|  | Example 1 | Example 2 | Example 3 | Example 4 | Example 5 | Comparative Example 1 | Comparative Example 2 |
|---|---|---|---|---|---|---|---|
| Number-Average Molecular Weight | 2005 | 2010 | 1995 | 2005 | 1995 | 1995 | 2005 |
| Primary Terminal OH ratio (%) | 98.5 | 96.6 | 99.5 | 98.4 | 96.4 | 98.1 | 94.8 |
| Secondary Terminal OH ratio (%) | 0.6 | 0.7 | 0.4 | 1.5 | 3.5 | 1.0 | 1.4 |
| C4 Proportion (mol %) | 64 | 63 | 73 | 72 | 73 | 42 | 62 |
| C46 Proportion (mol %) | 100 | 100 | 100 | 99 | 97 | 100 | 99 |
| Abbreviation of Polycarbonate Diol | PC-1 | PC-2 | PC-3 | PC-4 | PC-5 | PC-6 | PC-7 |

Example 6

In a reactor equipped with a stirrer, a thermometer and a cooling tube, 200 g of the polycarbonate diol (PC-1) obtained in Example 1 and 64.2 g of hexamethylene diisocyanate were placed, and the mixture was reacted at 100° C. for 4 hours to obtain an NCO-terminated prepolymer. To the prepolymer, 27.0 g of 1,4-butanediol as a chain extender and 0.01 g of dibutyltin dilaurate as a catalyst were added, and the mixture was reacted at 140° C. for 60 min using a laboratory-scale universal extruder with a built-in kneader (laboratory-scale universal extruder KR-35; made by Kasamatsu Plastic Engineering and Research Co., Ltd., Japan), and thereafter pelletized by the extruder. Evaluation results of the number-average molecular weight and weight-average molecular weight in terms of polystyrene by GPC and physical properties of the obtained thermoplastic polyurethane are shown in Table 2.

Examples 7 to 10

Thermoplastic polyurethanes were obtained by the method indicated in Example 6, except for using PC-2 to 5 as polycarbonate diols, respectively. Evaluation results of the number-average molecular weight and the weight-average molecular weight in terms of polystyrene by GPC and physical properties of each obtained thermoplastic polyurethane are shown in Table 2.

Comparative Examples 3 and 4

Thermoplastic polyurethanes were obtained by the method indicated in Example 6, except for using PC-6 and 7 as polycarbonate diols, respectively. Evaluation results of the number-average molecular weight and the weight-average molecular weight in terms of polystyrene by GPC and physical properties of each obtained thermoplastic polyurethane are shown in Table 2.

TABLE 2

|  | Example 6 | Example 7 | Example 8 | Example 9 | Example 10 | Comparative Example 3 | Comparative Example 4 |
|---|---|---|---|---|---|---|---|
| Polycarbonate Diol | PC-1 | PC-2 | PC-3 | PC-4 | PC-5 | PC-6 | PC-7 |
| Number-Average Molecular Weight ($10^4$ Mn) | 6.8 | 6.0 | 7.1 | 7.0 | 6.6 | 6.7 | 5.2 |
| Weight-Average Molecular Weight ($10^4$ Mw) | 14.6 | 13.2 | 15.1 | 14.9 | 14.2 | 14.4 | 12.7 |
| Hardness (Shore D) | 48 | 46 | 46 | 47 | 45 | 47 | 43 |
| Tensile Strength (MPa) | 31 | 28 | 33 | 32 | 30 | 31 | 19 |
| Elongation (%) | 700 | 680 | 720 | 710 | 670 | 700 | 540 |
| Impact Resilience (%) | 48 | 44 | 51 | 49 | 47 | 47 | 38 |
| Swelling Ratio (%) | 3.7 | 3.8 | 3.1 | 3.2 | 3.4 | 8.4 | 4.0 |

INDUSTRIAL APPLICABILITY

The present invention can be utilized as a raw material for polyurethanes, thermoplastic elastomers and the like having an excellent balance between physical properties such as hydrolysis resistance, heat resistance and flexibility, and also having high chemical resistances such as oleic acid resistance and chlorine resistance, or as a constituent material for coating materials, adhesives and the like.

The invention claimed is:

1. A polycarbonate diol comprising repeating units represented by the following formula (A) and a terminal hydroxyl group, wherein: from 90 to 100 mol % of the repeating units represented by the formula (A) are repeating units represented by the following formula (B) or (C);

the amount of the repeating units represented by the formula (B) is from 60 to 95 mol % based on the total amount of the repeating units represented by the formula (A);

the polycarbonate diol includes primary and secondary terminal OH groups and has a primary terminal OH ratio of from 96.4% to 99.5%; and the sum of the primary terminal OH ratio and the secondary terminal OH ratio of the polycarbonate diol is 98.5% or higher and 99.9% or lower; wherein formula (A) is

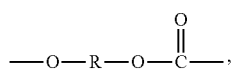
(A)

in which R represents a divalent aliphatic or alicyclic hydrocarbon having 2 to 12 carbon atoms, formula (B) is

(B)

and formula (C) is

(C)

2. The polycarbonate diol according to claim 1, wherein the amount of the repeating units represented by the formula (B) is from 70 to 95 mol % based on the total amount of the repeating units represented by the formula (A); and the polycarbonate diol has a number-average molecular weight of from 300 to 20,000.

3. A thermoplastic polyurethane, obtained by copolymerizing the polycarbonate diol according to claim 1 and a polyisocyanate.

4. A thermoplastic polyurethane, obtained by copolymerizing the polycarbonate diol according to claim 2 and a polyisocyanate.

* * * * *